US011303635B2

(12) United States Patent
Benko et al.

(10) Patent No.: US 11,303,635 B2
(45) Date of Patent: Apr. 12, 2022

(54) ASSISTED THIRD-PARTY PASSWORD AUTHENTICATION

(71) Applicant: Capital One Services, LLC, McLean, VA (US)

(72) Inventors: David Benko, San Franciso, CA (US); Michael Chen, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/895,808

(22) Filed: Jun. 8, 2020

(65) Prior Publication Data

US 2021/0385217 A1 Dec. 9, 2021

(51) Int. Cl.
*G06F 21/34* (2013.01)
*H04L 29/06* (2006.01)
*H04L 9/30* (2006.01)

(52) U.S. Cl.
CPC ........ *H04L 63/0884* (2013.01); *H04L 9/3073* (2013.01); *H04L 63/083* (2013.01); *H04L 63/166* (2013.01)

(58) Field of Classification Search
USPC ............ 726/9, 2, 21, 36; 713/150, 163, 181; 380/255, 264, 276
See application file for complete search history.

(56) References Cited

U.S. PATENT DOCUMENTS

| | | | | |
|---|---|---|---|---|
| 8,136,148 B1* | 3/2012 | Chayanam | ............. | G06F 21/31 726/5 |
| 8,544,067 B2* | 9/2013 | Grieve | .................... | G06F 21/31 726/4 |
| 8,666,904 B2* | 3/2014 | Pravetz | ................. | G06Q 10/00 705/64 |
| 9,191,382 B1* | 11/2015 | Hornung | ................ | G06F 21/31 |
| 2018/0375863 A1* | 12/2018 | Fan | ....................... | H04L 9/3247 |

* cited by examiner

*Primary Examiner* — Sharif E Ullah
(74) *Attorney, Agent, or Firm* — Sterne, Kessler, Goldstein & Fox P.L.L.C.

(57) ABSTRACT

Disclosed herein are system, method, and apparatus for assisted third-party password authentication. The method performed at a client device includes creating a secure connection from an inline frame associated with a first application on the client device to an authorization server for accessing a second application. The method includes identifying, by the inline frame, one or more events that represent inputs for a user authorization credential, and proxying, by the inline frame, the identified one or more events to the authorization server using the secure connection. The method includes receiving an authorization code from the authorization server in response to the proxying. The method includes redirecting, by the inline frame, the authorization code to the application on the client device. The method includes transmitting, from the client device to the authorization server, the authorization code to receive an access token for accessing the second application.

15 Claims, 4 Drawing Sheets

ASSISTED THIRD-PARTY PASSWORD AUTHENTICATION

BACKGROUND

OAuth, an open-standard authorization framework, describes a mechanism for the unrelated servers and services to allow authenticated access to their resources. The authentication process using OAuth does not require actual sharing of the user's authentication credentials with the server from which the request for resources of the third-party server or service is requested. After successful authorization, in OAuth flow, the authorization server redirects the user to an application along with an authorization code or access token. The redirection of the user is achieved using a uniform resource locator (URL), which contains sensitive information. Therefore, if the user is redirected to a rogue URL, the user's confidential information will be compromised. In other words, the current OAuth framework has security flaws that need to be addressed.

SUMMARY

Embodiments provide assisted third-party password authentication. In one embodiment, a method is disclosed and performed by a client device. The method includes creating a secure connection from an inline frame associated with a first application on the client device to an authorization server for accessing a second application. The method includes identifying, by the inline frame, one or more events that represent inputs for a user authorization credential, and proxying, by the inline frame, the identified one or more events to the authorization server using the secure connection. The method includes receiving an authorization code from the authorization server in response to the proxying. The method includes redirecting, by the inline frame, the authorization code to the application on the client device. The method includes transmitting, from the client device to the authorization server, the authorization code to receive an access token for accessing the second application.

The method may also include generating, by the inline frame, a form for receiving the user credential, and updating the form with a graphical symbol to avoid interrogation of a document object model (DOM) element associated with the form. The method may also include inserting, by the client device, the inline frame in the first application based on an agreement between the first application and the second application according to a restricted access policy. The method may also include inserting, by the client device, the inline frame in the first application upon receiving a message from the second application to insert the inline frame according to a restricted access policy. The method may also include encrypting the one or more events proxied to the authorization server using a public-private key pair. The method may also include establishing a connection between the inline frame and the authorization server using a secure connection protocol from a group comprising transport layer security (TLS), secure socket layer (SSL), secure socket shell (SSH), and hypertext transfer protocol over SSL/TLS (HTTPS) for creating the secure connection. In the embodiment, the first application may be a first hypertext markup language (HTML) page, and the second application may be a second HTML page. The first HTML page is different from the second HTML page.

System and computer-readable medium embodiments are also disclosed.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Various embodiments of this disclosure will be discussed with respect to the corresponding figures.

Figure 1:
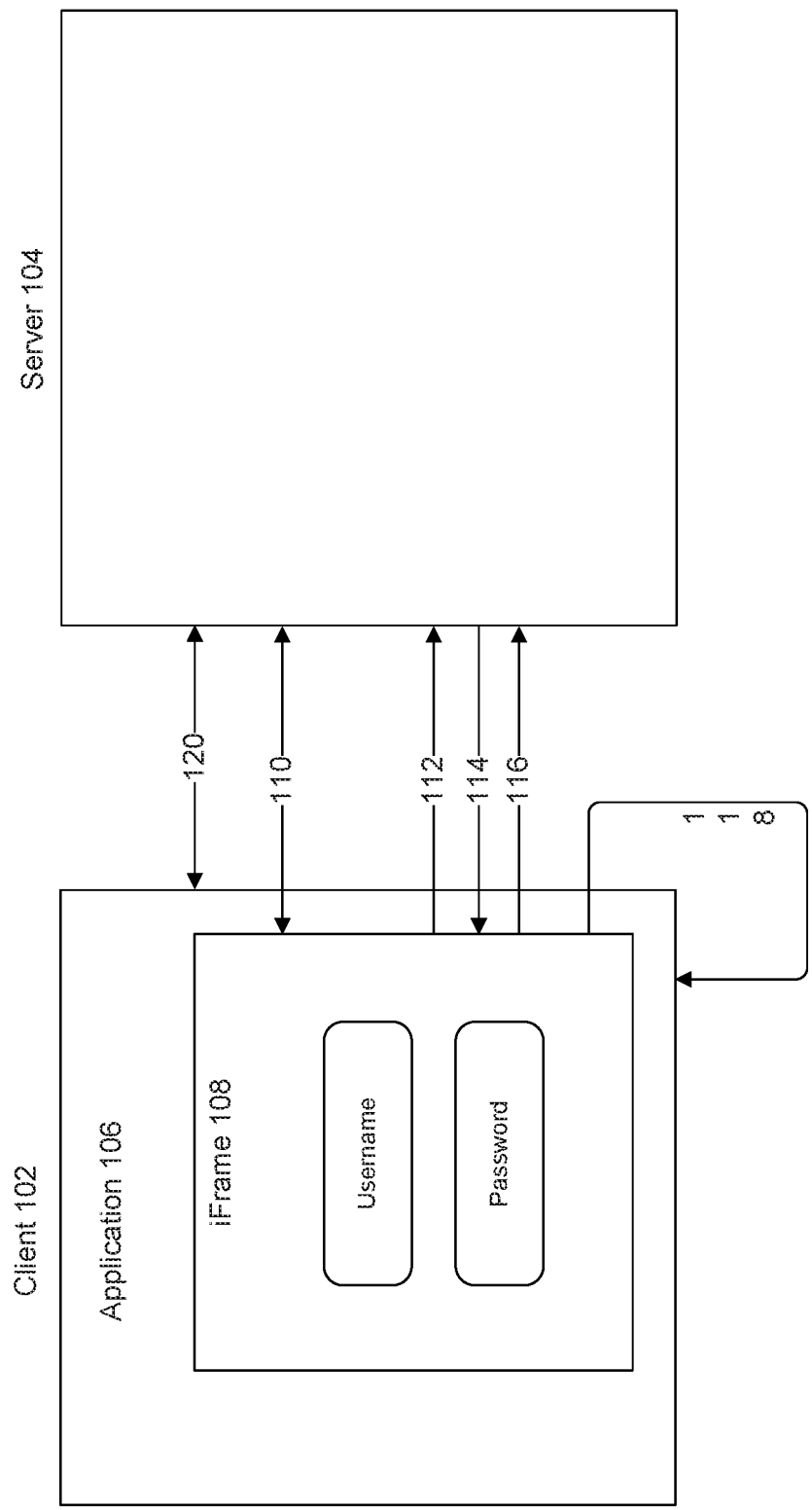
FIG. 1 illustrates a block diagram of an example network environment, according to some embodiments.

FIG. 1 illustrates a block diagram of an example network environment in which various embodiments described in this disclosure may be practiced. In FIG. 1, a client 102 and a server 104 are shown. The client 102 may be a client device in which a first application may be running. By way of a non-limiting example, the first application may be a web browser application or any other mobile application. The other mobile application may invoke a web browser to perform some of the functions related to authorization and authentication of a user on the client 102. The web browser application may use a hypertext transfer protocol (HTTP) or a hypertext transfer protocol secure (HTTPS) protocol to communicate with the server 104.

The server 104 may provide an authorization service to a user. For example, when a user on the client 102 requests service or access to a second application running on the server 104 or another server, the user may need to be authenticated and/or authorized before the user is granted the requested service or access to the second application. The second application is, therefore, a third-party service or application since the user is requesting the service of the second application while the user is on the first application at the client 102.

The OAuth framework can be used for the authorization of the user at the first application to request access to the second application. However, when the user provides authorization credentials to be authorized for the service request or access of the second application, the user's authorization credentials may be interrogated by the first application. The user may not prefer that the authorization credentials be leaked or revealed to the first application because the user may not trust that the first application can keep the authorization credentials secure. Accordingly, for this or any other security reasons, if the user does not want the first application to know the authorization credentials, such an objective may be achieved based on the embodiments, as described herein.

In accordance with some embodiments, messages exchanged between the client 102 and the server 104 is shown in FIG. 1. When the user in the first application at the client 102 wants service from or access to the second application, the first application may insert an embedded frame in an HTML page of the first application. This may be rendered to the user based on an agreement between the first application and the second application. The embedded frame is referenced in this disclosure as an iframe.

A restricted access policy is a mechanism that allows restricted access to the resources of an application from another application in a different domain. One example of a restricted access policy is a cross origin resource sharing (CORS) policy. Using the restricted access policy mechanism, the first application may embed images, stylesheets, scripts, iframes, and videos to request access to the resources of the second application from the first application. Assuming that the first application on the client 102 is an application compatible with the restricted access policy, the first application may send an HTTP GET request with an HTTP header Origin. The first application may use the HTTP header Origin to identify itself with the second application. Based on an agreement between the first application and the second application, the second application may include an Access-Control-Allow-Origin (ACAO) header in response to the HTTP GET request. A value for the ACAO header may identify the application, which is granted access to the resources of the second application.

Therefore, as shown in FIG. 1 by step 110, the first application on the client 102 embeds an iframe to the server 104. In other words, the iframe enables the communication between the iframe and the server 104. In some embodiments, the client 102 or the first application may embed an iframe upon receipt of a message from the second application.

As shown in FIG. 1, at step 112, the iframe interrogates itself. When the iframe interrogates itself, the iframe identifies the authorization server information. For example, server 104 may be identified as the authorization server based on HTML tags in the iframe. The iframe may include an HTML tag, for example, <AuthServer> may specify either an IP address or a fully qualified domain name (FQDN) of the server to be used as an authorization server. Because the iframe is inserted based on the agreement between the first application provider and the second application provider, the iframe to be inserted in the first application may include the IP address or the FQDN of the authorization server. The iframe may create a WebSocket connection from the iframe to the server 104 based on the HTML tag identifying the authorization server. The WebSocket connection may be created using a secure connection protocol. By way of a non-limiting example, any protocol from a transport layer security (TLS), secure socket layer (SSL), secure socket shell (SSH), and hypertext transfer protocol over SSL/TLS (HTTPS) may be used for creating a secure communication link between the iframe and the server 104.

As shown in FIG. 1, at step 114, after the secure WebSocket connection is established between the iframe and the server 104, the server 104 operates in an authorization server role. The server 104 may instruct the iframe to paint a canvas in the rendered HTML page of the first application. Accordingly, the iframe paints a canvas that appears to the user as a form in which the user may enter authorization credential information, i.e., username and/or password. Based on the authorization credential information, the server 104 may perform authorization of the user. The iframe then listens for key events, such as the user-provided inputs for the username and/or password. As the user provides the username and/or password information, the iframe may add a graphical symbol to appear as the user input. When the user backtracks while providing input for the username and/or password, the iframe may remove the graphical symbol correspondingly. The graphical symbol may be any character, such as a dot (•), and/or an asterisk mark (*), etc.

As shown in FIG. 1, at step 116, upon receiving or listening to the key event, the iframe may proxy the key event to the server 104 over the secure WebSocket connection between the iframe and the server 104 (authorization server). Proxying the key event to the server $104n$ means the iframe transmits the key event to the server 104 over the secure WebSocket connection between the iframe and the server 104. By way of a non-limiting example, the iframe may transmit the key event using the TCP or UDP message carrying the key event as payload, JavaScript object notation (JSON), simple object access protocol (SOAP) web service, or representational state transfer (REST) web service. Because the key events are proxied to the server 104 upon listening to the key event, the iframe may not store these key events in the document object model (DOM) element. Therefore, the first application cannot interrogate the iframe to obtain the authorization credentials that the user-provided. Thereby, the user communicates the authorization credentials to the authorization server, and, even though the user entered the authorization credentials at the first application, the first application cannot acquire the user-provided authorization credentials. In some embodiments, the proxied events may be encrypted using a public-private key pair or any other encryption mechanism for additional security and protection of the proxied events from rogue elements before the proxied events arrive at the server 104.

As shown in FIG. 1, at step 118, upon receiving the user's authorization credential information as proxied events from the iframe, the server 104 may perform verification of the authorization credentials. Based upon an outcome of the verification, the server 104 may send an authorization code to the iframe if the authorization was successful. Upon receiving the authorization code from the server 104, the iframe may post the received authorization code to a parent. By way of a non-limiting example, the parent may be an HTML page of the first application within which the iframe is embedded. At step 120, the first application may use the authorization code to request an access token from the server 104. The authorization code may be valid for a pre-configured time duration to avoid reuse of the authorization code. Accordingly, if the first application does not use the authorization code to receive an access token from the server 104 within that pre-configured time duration, an error may be generated and displayed by the first application and/or iframe. The access token may also be valid for another pre-configured time duration to avoid giving the first application permanent permission to access the second application. The access token may be refreshed at a pre-configured time interval. Thereby, either the server 104 may issue a new access token, or the validity of the access token may be extended. The new access token may not be issued, or the validity of the access token may not be extended beyond a predetermined time period from the time the authorization code is sent to the iframe.

In some embodiments, the iframe may be closed after an access token is received. In other words, the first application may remove the inserted iframe from the HTML page rendered to the user. By way of a non-limiting example, in some embodiments, the iframe may be closed when the iframe posts the received authorization code from the server 104 to the first application. The authorization code may be posted using a redirect or other method mutually agreed between the first application and the iframe. In some embodiments, the inserted iframe may not be removed from the HTML page rendered to the user, but the secure WebSocket connection between the iframe and the authorization server may be terminated.

Figure 2:
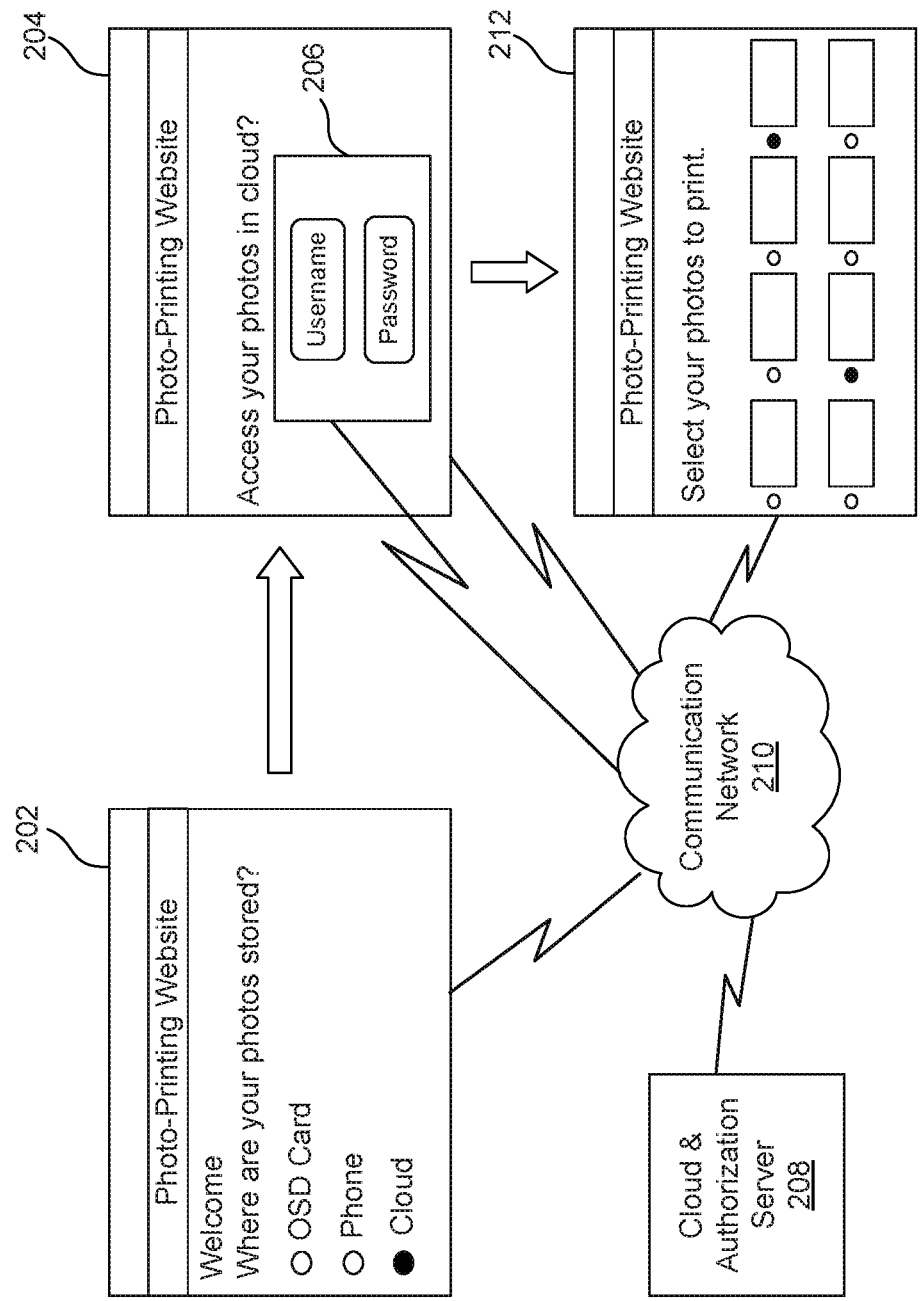
FIG. 2 illustrates an example application using assisted third-party password authentication, according to some embodiments.

Referring to FIG. 2, in accordance with some embodiments, an example application for using assisted third-party password authentication is displayed. As shown in FIG. 2, a user may visit a website, for example, a photo-printing website, to print photos. HTML page 202 may be rendered to the user when the user types the URL address of the photo-printing website in an address bar of an internet browser. The HTML page 202 may ask the user for a source location of the photos to be printed. By way of a non-limiting example, the user may have photos stored in an SD card, in a phone, and/or in a server in a cloud network. The user may have an account with a cloud service and store photos, videos, documents, etc., in a cloud and authorization server 208 associated with the account. Accordingly, for printing one or more photos stored at the cloud server or any of the sources mentioned above, the user may input appropriate information identifying the source location of the photos to be printed.

In the cloud server example above, the user then provides the photo printing website access to the one or more photos stored at a cloud and authorization server 208. The user may first need to authenticate with the cloud service using the account with the cloud service. As shown in FIG. 2, an HTML page 204 with an embedded iframe 206 may be rendered to the user based on an agreement between the cloud service and the photo printing website according to the restricted access policy described above. The user may utilize the iframe 206 to provide authorization credentials, i.e., a username and/or a password, of the account with the cloud service.

The iframe 206 may include, in an HTML tag, an IP address or a fully qualified domain name (FQDN) of an authorization server, which performs authorization of the user's account with the cloud service. By way of a non-limiting example, the authorization service for the cloud service may be on the cloud and authorization server 208. However, the authorization service may be implemented on a server different from the server used for storing user content. The iframe 206 interrogates itself to identify the IP address or the FQDN to establish a secure WebSocket connection to the cloud and authorization server 208. After creating the secure WebSocket connection, the cloud and authorization server 208 may instruct the iframe 206 to paint a canvas in the rendered HTML page 204 of the photo-printing website. Accordingly, the iframe 206 paints a canvas that appears to the user as a form in which the user may enter authorization credential information, i.e., username and/or password. Based on the authorization credential information, the cloud and authorization server 208 may perform an authorization of the user.

The iframe 206 listens for key events, such as the user-provided inputs for the username and/or password. As the user provides input for the username and/or password information, the iframe may add a graphical symbol to appear as the user input. When the user backtracks while providing input for the username and/or password, the iframe may remove the graphical symbol correspondingly. The graphical symbol may be any character, such as a dot (•), and/or an asterisk mark (*), etc. Upon receiving or listening to the key event, the iframe 206 may proxy the key event to the cloud and authorization server 208 over the secure WebSocket connection between the iframe 206 and the cloud and authorization server 208. Proxying the key event to the cloud and authorization server 208 means the iframe 206 transmits the key event to the cloud and authorization server 208 over the secure WebSocket connection between the iframe 206 and the cloud and authorization server 208. As described above, the iframe 206 may transmit the key event using the TCP or UDP message carrying the key event as payload, JavaScript object notation (JSON), simple object access protocol (SOAP) web service, or representational state transfer (REST) web service.

Because the key events are proxied to the cloud and authorization server 208 upon listening to the key event, the iframe 206 may not store these key events in the document object model (DOM) element. Therefore, the photo-printing website cannot interrogate the iframe 206 to obtain the authorization credentials that the user-provided. Thereby, the user communicates the authorization credentials to the cloud and authorization server 208, and, even though the user entered the authorization credentials at the photo-printing website, the photo-printing website cannot acquire the user-provided authorization credentials. For additional security and protection of the proxied events from rogue elements, before the proxied events arrive at the cloud and authorization server 208, the proxied events may be encrypted using a public-private key pair or any other encryption mechanism.

Upon receiving the user's authorization credential information as proxied events from the iframe 206, the cloud and authorization server 208 may perform verification of the authorization credentials. Based upon an outcome of the verification, the cloud and authorization server 208 may send an authorization code to the iframe 206 if the authorization was successful. Upon receiving the authorization code from the cloud and authorization server 208, the iframe 206 may post the received authorization code to the HTML page 204. The photo-printing website may use the authorization code to request an access token from the cloud and authorization server 208. The photo-printing website may send a request to the cloud and authorization server 208 for the access token and include the authorization code in the request. If the authorization code in the request for the access token is valid, the cloud and authorization server 208 may send an access token to the photo-printing website. The access token may be included in subsequent requests from the photo printing website to the cloud and authorization server 208 to access resources, for example, stored photos, of the user at the cloud and authorization server 208 associated with the user's account with the cloud service.

The photo-printing website may use the access token received from the cloud and authorization server 208 to access the user's photos stored at the cloud and authorization server 208, and display the photos to the user, as shown in an HTML page marked 212. The user can select one or more photos for printing from the displayed photos.

In the example application shown in FIG. 2, the photo-printing website, the iframe 206, and the cloud and authorization server 208 communicate with each other over a communication network 210. The communication network 210 may be a wireless and/or a wireless network. The communication network 210 may enable communication using 3G, 4G, 5G, 6G, Wi-Fi, and/or WiMAX, etc. Further, the photo-printing website in the present disclosure is for illustration purposes only and non-limiting.

The embodiments in the present disclosure apply to any application that may embed an iframe. By way of a non-limiting example, the present disclosure may be applied to integrate a website of an inventory provider, such as a car dealership, to share the buyer's profile at a lender's website. Based on the present disclosure, the buyer's profile at the lender's website may be accessed from the car dealership website without providing the buyer's authorization credential information to the dealer's website.

Typically, third party authorization is performed via the OAuth 2.0 Authorization Code Grant, which requires the user's web browser to be redirected to an authorization server. Because the user's web browser is redirected to the authorization server, implementing a white-label service is difficult. In some embodiments, a secure WebSocket connection may be established between an iframe and an authorization server based on a CORS policy discussed herein, in which the user's web browser is not required to be redirected. Therefore, using the embodiments described herein, a white-label service may be implemented easily.

Figure 3:
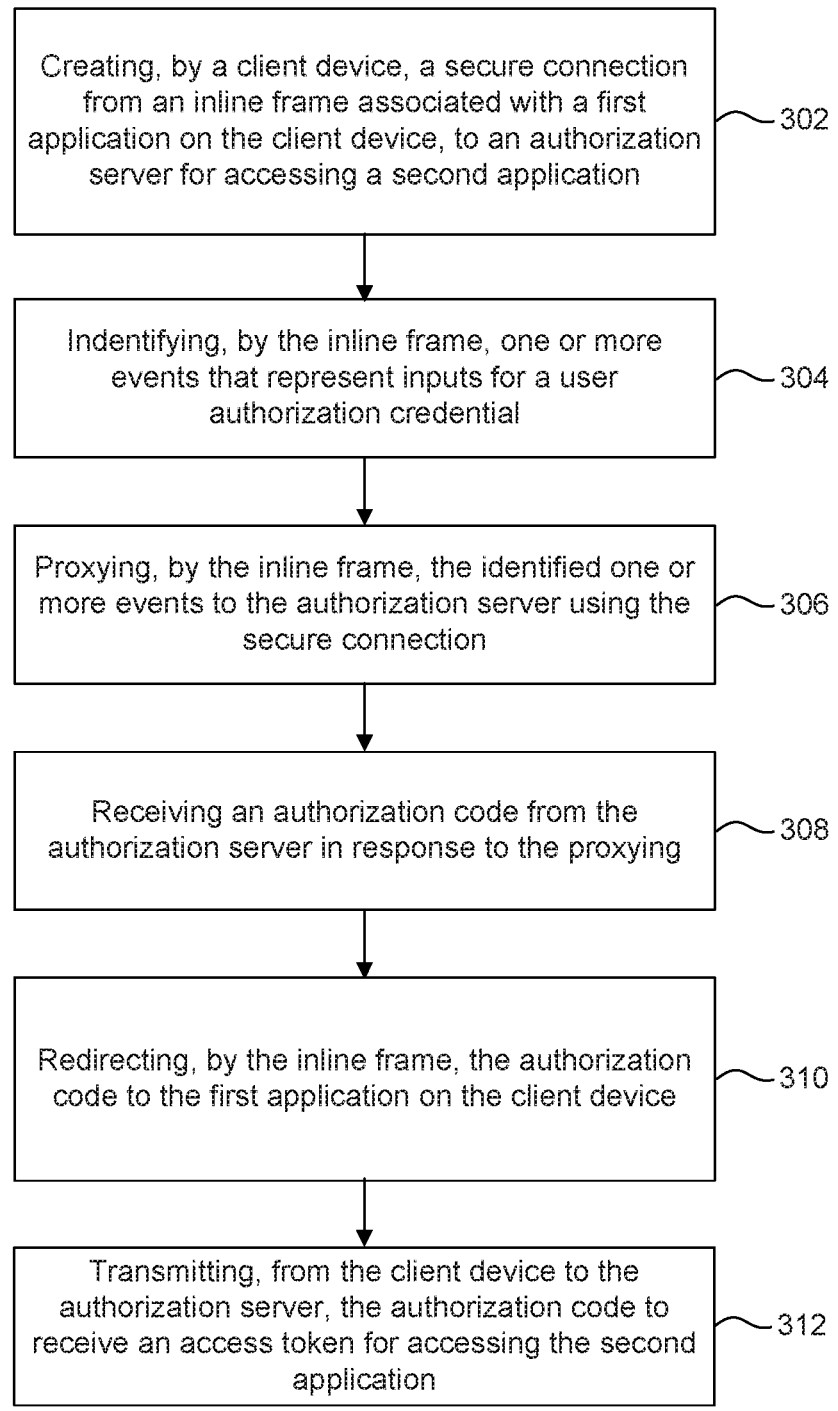
FIG. 3 is a flowchart illustrating a method for assisted third-party password authentication, according to some embodiments.

FIG. 3 is a flowchart illustrating a method for assisted third-party password authentication, according to some embodiments. At step 302, a secure connection from an inline frame (iframe) may be created between the iframe and an authorization server. The authorization server may be the server 104 shown in FIG. 1. The iframe may be embedded in an HTML page rendered to the user for a first application. Thus, the iframe is associated with the first application. As described above, the first application may be running on a client device. By way of a non-limiting example, the client device may be a computer, a laptop, a mobile phone, a smartphone, a tablet, or any other user equipment device that can support internet communication using a web browser. The web browser may use HTTP, HTTPS, or any other suitable protocol to communicate with other applications running on a server. As described above with reference to FIG. 1, the secure connection from the iframe to the authorization server is created so that the user can access a second application from the first application without allowing the first application to know the user's authorization credential to access the second application. As described above, the second application may be running on the server 104 or any other server.

At step 304, the inline frame may identify one or more events that represent inputs for the user's authorization credential information. As described above, with reference to FIG. 1, the iframe paints a canvas that appears to the user as a form in which the user may enter authorization credential information, such as a username and/or a password. The iframe may add or remove a graphical symbol, such as a dot (•), and/or an asterisk mark (*), etc. At step 306, the iframe may proxy or transmit the identified one or more events to the authorization server over the secure connection established at step 302. As described above, the identified one or more events may be encrypted using a public-private key pair or any other encryption mechanism for additional security, and then proxied to the authorization server.

At step 308, the iframe may receive an authorization code from the authorization server if the authorization server may perform verification of the user's authorization credential successfully based on the proxied one or more events to the authorization server. The authorization code may be valid for a pre-configured time duration. By way of a non-limiting example, the authorization code may be valid for 2 minutes. The authorization code may be redirected by the iframe to the first application on the client device, as shown by step 310 in FIG. 3.

The first application may then transmit the authorization code to the authorization server at step 312. Based on the authorization code, the authorization server may issue an access token to the first application. The access token may be then used by the first application to access the second application and services provided by the second application. The first application may include the access token in all or some communication messages with the second application. The second application may verify the access token, and upon successful verification of the access token, resources or services of the second application may be accessed from the first application. The access token, as described above, may be valid for a predetermined time interval. The access token may be refreshed or extended for an additional time period.

Figure 4:
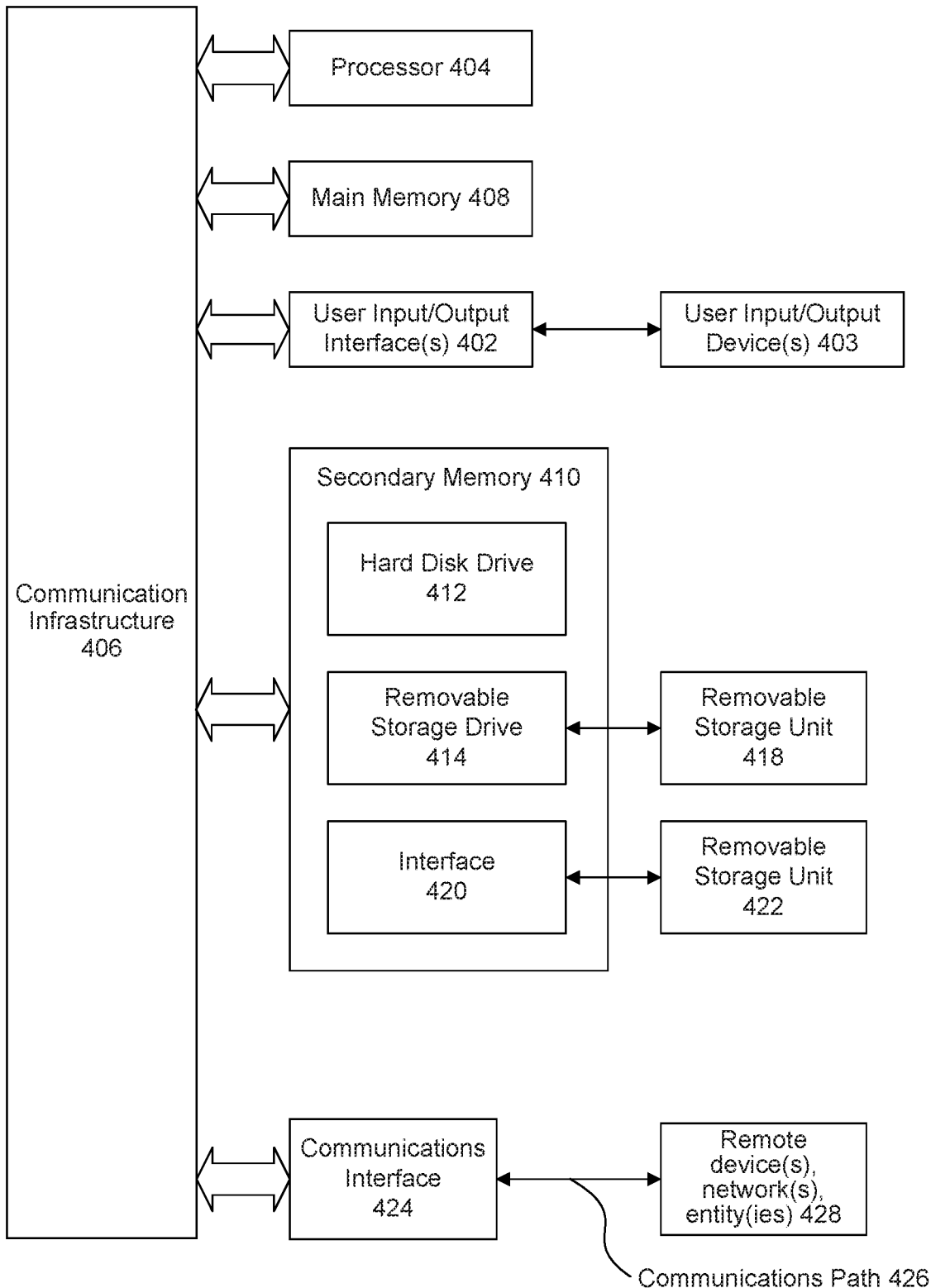
FIG. 4 illustrates an example computer system, according to some embodiments.

FIG. 4 illustrates an example computer system in accordance with some embodiments.

Various embodiments may be implemented, for example, using one or more well-known computer systems, such as a computer system 400, as shown in FIG. 4. One or more computer systems 400 may be used, for example, to implement any of the embodiments discussed herein, as well as combinations and sub-combinations thereof. The computer systems 400 may be used for the implementation of one or more embodiments described above.

The computer system 400 may include one or more processors (also called central processing units, or CPUs), such as a processor 404. The processor 404 may be connected to a communication infrastructure or bus 406.

The computer system 400 may also include user input/output device(s) 403, such as monitors, keyboards, pointing devices, etc., which may communicate with communication infrastructure 406 through user input/output interface(s) 402.

One or more processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 400 may also include a main or primary memory 408, such as random access memory (RAM). Main memory 408 may include one or more levels of cache. Main memory 308 may have stored therein control logic (i.e., computer software) and/or data.

The computer system 400 may also include one or more secondary storage devices or memory 410. The secondary memory 410 may include, for example, a hard disk drive 412 and/or a removable storage device or drive 414. The removable storage drive 414 may be a floppy disk drive, a magnetic tape drive, a compact disk drive, an optical storage device, tape backup device, and/or any other storage device or storage drive.

The removable storage drive 414 may interact with a removable storage unit 418. The removable storage unit 418 may include a computer-usable or readable storage device having stored thereon computer software (control logic) and/or data. The removable storage unit 418 may be a floppy disk, magnetic tape, compact disk, DVD, optical storage disk, and/any other computer data storage device. The removable storage drive 414 may read from and/or write to the removable storage unit 418.

The secondary memory 410 may include other means, devices, components, instrumentalities, or other approaches for allowing computer programs and/or other instructions and/or data to be accessed by the computer system 400. Such means, devices, components, instrumentalities, or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 400 may further include a communication or network interface 424. The communication interface 424 may enable the computer system 400 to communicate and interact with any combination of external devices, external networks, external entities, etc. (individually and collectively referenced by reference number 428). For example, the communication interface 424 may allow the computer system 400 to communicate with the external or remote devices 428 over communications path 426, which may be wired and/or wireless (or a combination thereof), and which may include any combination of LANs, WANs, the Internet, etc. Control logic and/or data may be transmitted to and from the computer system 400 via the communication path 426.

The computer system 400 may also be any of a personal digital assistant (PDA), desktop workstation, laptop or notebook computer, netbook, tablet, smartphone, smartwatch or another wearable, appliance, part of the Internet-of-Things, and/or embedded system, to name a few non-limiting examples, or any combination thereof.

The computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 400, the main memory 408, the secondary memory 410, and the removable storage units 418 and 422, as well as tangible articles of manufacture embodying any combination of the foregoing. Such control logic, when executed by one or more data processing devices (such as the computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed is:

1. A method, comprising:
creating, by a client device, a secure connection from an inline frame associated with a first application on the client device to an authorization server for accessing a second application;
identifying, by the inline frame, one or more events that represent inputs for a user authorization credential, wherein the inline frame prevents storage of the user authorization credential and the first application is prevented from accessing the user authorization credential;
proxying, by the inline frame, the identified one or more events to the authorization server using the secure connection;
receiving an authorization code from the authorization server in response to the proxying;
redirecting, by the inline frame, the authorization code to the first application on the client device;
transmitting, from the client device to the authorization server, the authorization code to receive an access token for accessing the second application;
generating, by the inline frame, a form for receiving the user authorization credential;
updating the form with a graphical symbol to avoid interrogation of a document object model (DOM) element associated with the form;
inserting, by the client device, the inline frame in the first application upon receiving a message from the second application to insert the inline frame according to a restricted access policy; and
closing the inline frame upon receiving the access token from the authorization server.

2. The method of claim 1, further comprising:
inserting, by the client device, the inline frame in the first application based on an agreement between the first application and the second application according to the restricted access policy.

3. The method of claim 1, further comprising:
encrypting the one or more events proxied to the authorization server using a public-private key pair.

4. The method of claim 1, wherein creating the secure connection comprises:
establishing a connection between the inline frame and the authorization server using a secure connection protocol from a group comprising transport layer security (TLS), secure socket layer (SSL), secure socket shell (SSH), and hypertext transfer protocol over SSL/TLS (HTTPS).

5. The method of claim 1, wherein the first application is a first hypertext markup language (HTML) page and the second application is a second HTML page, and wherein the second HTML page is different from the first HTML page.

6. An apparatus, comprising:
a memory for storing operations; and
a processor coupled to the memory, wherein the operations, when executed by the processor, cause the processor to:
creating, by a client device, a secure connection from an inline frame associated with a first application on the client device, to an authorization server for accessing a second application;
identifying, by the inline frame, one or more events that represent inputs for a user authorization credential, wherein the inline frame prevents storage of the user authorization credential and the first application is prevented from accessing the user authorization credential;
proxying, by the inline frame, the identified one or more events to the authorization server using the secure connection;
receiving an authorization code from the authorization server in response to the proxying;
redirecting, by the inline frame, the authorization code to the first application on the client device; and
transmitting, from the client device to the authorization server, the authorization code to receive an access token for accessing the second application;
generating, by the inline frame, a form for receiving the user authorization credential;
updating the form with a graphical symbol to avoid interrogation of a document object model (DOM) element associated with the form;
inserting, by the client device, the inline frame in the first application upon receiving a message from the second application to insert the inline frame according to a restricted access policy; and
closing the inline frame upon receiving the access token from the authorization server.

7. The apparatus of claim 6, wherein the operations further comprise:
inserting, by the client device, the inline frame in the first application based on an agreement between the first application and the second application according to the restricted access policy.

8. The apparatus of claim 6, wherein the operations further comprise: encrypting the one or more events proxied to the authorization server using a public-private key pair.

9. The apparatus of claim 6, wherein for creating the secure connection, the operations further comprise:
establishing a connection between the inline frame and the authorization server using a secure connection protocol from a group comprising transport layer security (TLS), secure socket layer (SSL), secure socket shell (SSH), and hypertext transfer protocol over SSL/TLS (HTTPS).

10. The apparatus of claim 6, wherein the first application or the second application is a hypertext markup language (HTML) page.

11. A non-transitory, tangible computer-readable device having instructions stored thereon that, when executed by at least one computing device of a client device, causes the at least one computing device to perform operations comprising:
creating, by the client device, a secure connection from an inline frame associated with a first application on the client device, to an authorization server for accessing a second application;
identifying, by the inline frame, one or more events that represent inputs for a user authorization credential, wherein the inline frame prevents storage of the user authorization credential and the first application is prevented from accessing the user authorization credential;
proxying, by the inline frame, the identified one or more events to the authorization server using the secure connection;
receiving an authorization code from the authorization server in response to the proxying;
redirecting, by the inline frame, the authorization code to the first application on the client device;
transmitting, from the client device to the authorization server, the authorization code to receive an access token for accessing the second application;
generating, by the inline frame, a form for receiving the user authorization credential;
updating the form with a graphical symbol to avoid interrogation of a document object model (DOM) element associated with the form;
inserting, by the client device, the inline frame in the first application upon receiving a message from the second application to insert the inline frame according to a restricted access policy; and
closing the inline frame upon receiving the access token from the authorization server.

12. The non-transitory, tangible computer-readable device of claim 11, wherein the operations further comprise:
inserting, by the client device, the inline frame in the first application based on an agreement between the first application and the second application according to the restricted access policy.

13. The non-transitory, tangible computer-readable device of claim 11, wherein the operations further comprise:
encrypting the one or more events proxied to the authorization server using a public-private key pair.

14. The non-transitory, tangible computer-readable device of claim 11, wherein when creating the secure connection the operations further comprise:
establishing a connection between the inline frame and the authorization server using a secure connection protocol from a group comprising transport layer security (TLS), secure socket layer (SSL), secure socket shell (SSH), and hypertext transfer protocol over SSL/TLS (HTTPS).

15. The method of claim 1, wherein the first application is a first hypertext markup language (HTML) page and the second application is a second HTML page, and wherein the second HTML page is different from the first HTML page.

* * * * *